(12) United States Patent
Tang et al.

(10) Patent No.: US 11,075,686 B2
(45) Date of Patent: Jul. 27, 2021

(54) SIGNAL TRANSMISSION METHOD AND DEVICE

(71) Applicant: GUANGDONG OPPO MOBILE TELECOMMUNICATIONS CORP., LTD., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 421 days.

(21) Appl. No.: 16/305,546

(22) PCT Filed: Sep. 29, 2016

(86) PCT No.: PCT/CN2016/100940
§ 371 (c)(1),
(2) Date: Nov. 29, 2018

(87) PCT Pub. No.: WO2018/058467
PCT Pub. Date: Apr. 5, 2018

(65) Prior Publication Data
US 2021/0175959 A1    Jun. 10, 2021

(51) Int. Cl.
*H04W 56/00* (2009.01)
*H04B 7/08* (2006.01)
*H04B 7/0413* (2017.01)

(52) U.S. Cl.
CPC ...... *H04B 7/0897* (2013.01); *H04W 56/0015* (2013.01); *H04B 7/0413* (2013.01)

(58) Field of Classification Search
CPC .. H04B 7/0408; H04B 7/0617; H04B 7/0695; H04J 11/0069; H04W 16/28;
(Continued)

(56) References Cited

U.S. PATENT DOCUMENTS

| | | | |
|---|---|---|---|
| 2013/0064239 A1* | 3/2013 | Yu | H04W 48/12 370/350 |
| 2016/0100373 A1* | 4/2016 | Chen | H04J 11/0069 370/350 |
| 2016/0212631 A1* | 7/2016 | Shen | H04W 56/001 |
| 2016/0277225 A1 | 9/2016 | Frenne et al. | |
| 2017/0181134 A1* | 6/2017 | Niu | H04B 17/318 |
| 2017/0251444 A1* | 8/2017 | Huang | H04W 16/28 |

(Continued)

FOREIGN PATENT DOCUMENTS

| | | |
|---|---|---|
| CN | 103748801 A | 4/2014 |
| CN | 104734758 A | 6/2015 |

(Continued)

OTHER PUBLICATIONS

The Third Office Action for the CN application No. 201680085830.6; dated Mar. 9, 2020.
(Continued)

*Primary Examiner* — Robert J Lopata

(57) ABSTRACT

Disclosed are a signal transmission method and device. The method includes: a terminal receives a synchronization signal sent by a network side device; the terminal determines a beam Identifier (ID) and at least part of cell ID according to the synchronization signal; and the terminal transmits a subsequent signal according to the beam ID and/or the at least part of cell ID. In the embodiments, the terminal can determine the beam ID and the at least part of the cell ID according to the synchronization signal and thus the terminal determines a beam used when the subsequent signal is transmitted.

19 Claims, 3 Drawing Sheets

(58) Field of Classification Search
CPC ............ H04W 56/001; H04W 72/005; H04W 72/0453; H04W 72/046; H04W 72/0466
USPC .......................................................... 370/328
See application file for complete search history.

(56) References Cited

U.S. PATENT DOCUMENTS

| | | | |
|---|---|---|---|
| 2018/0123849 A1* | 5/2018 | Si .................... | H04L 27/2675 |
| 2018/0176065 A1* | 6/2018 | Deng ................. | H04B 7/088 |
| 2018/0309495 A1* | 10/2018 | Xiong ................ | H04B 7/088 |
| 2019/0098608 A1* | 3/2019 | Yi ..................... | H04L 27/26 |
| 2019/0166612 A1* | 5/2019 | Yokomakura ....... | H04W 72/04 |
| 2019/0200397 A1* | 6/2019 | Jia .................... | H04W 72/046 |
| 2019/0223174 A1* | 7/2019 | Shimizu ............. | H04B 7/0695 |
| 2019/0230696 A1* | 7/2019 | Kim .................. | H04L 5/0053 |
| 2020/0053672 A1* | 2/2020 | Tang .................. | H04W 16/28 |

FOREIGN PATENT DOCUMENTS

| | | |
|---|---|---|
| CN | 105393467 A | 3/2016 |
| CN | 105493547 A | 4/2016 |
| CN | 105723639 A | 6/2016 |
| EP | 3249825 A1 | 11/2017 |
| WO | 2012173436 A2 | 12/2012 |
| WO | 2015080646 A1 | 6/2015 |
| WO | 2015090067 A1 | 6/2015 |
| WO | 2016115711 A1 | 7/2016 |

OTHER PUBLICATIONS

The First Office Action for TW patent application No. 106128829, dated Apr. 8, 2020.
Extended European Search Report for EP application No. 16917221.0, dated Jun. 7, 2019.
The first Office Action of the corresponding CN patent application No. 201680085830.6, dated Aug. 20, 2019.
The second Office Action of the corresponding CN patent application No. 201680085830.6, dated Nov. 12, 2019.
The first examination report of the corresponding IN patent application No. 201817046794, dated Oct. 28, 2020.
International Search Report for corresponding application PCT/CN2016/100940 filed on Sep. 29, 2016; dated Jun. 5, 2017.

* cited by examiner

SIGNAL TRANSMISSION METHOD AND DEVICE

TECHNICAL FIELD

The embodiments of the present disclosure relate to the field of communications, and more particularly, to a signal transmission method and device.

BACKGROUND

A Multiple-Input Multiple-Output (MIMO) technology is fully applied in a Long Term Evolution (LTE) system. By performing antenna array based signal preprocessing on a signal, the obvious beamforming gain is obtained to expand the coverage range and improve the edge throughput and the interference suppression.

In the LTE system, mere one beam can be adopted by a cell public signal (such as a synchronization signal) for transmission. In general, the beam comprises a "wide beam" capable of covering a whole cell. Compared with a "narrow beam", the public signal transmitted by the wide beam cannot obtain enough beamforming gain so that the transmission quality of the public signal is affected.

In order to improve the transmission quality of the public signal, multiple beams (such as the narrow beam) may be adopted to transmit the public signal. However, a terminal cannot determine that the public signal is obtained through which beam in the cell and thus cannot use the beam in a subsequent signal transmission process.

SUMMARY

The embodiments of the present disclosure provide a signal transmission method and device, which can enable a terminal to determine a beam used when a subsequent signal is transmitted.

A first aspect provides a signal transmission method, which includes: a terminal receives a synchronization signal sent by a network side device; the terminal determines a beam Identifier (ID) and at least part of cell ID according to the synchronization signal; and the terminal transmits a subsequent signal according to the beam ID and/or the at least part of the cell ID.

In the embodiments of the present disclosure, the terminal can determine the beam ID and the at least part of the cell ID according to the synchronization signal and thus the terminal determines the beam used when the subsequent signal is transmitted.

In combination with the first aspect, in one possible implementation manner of the first aspect, that the terminal determines the beam ID and the at least part of cell ID according to the synchronization signal includes: the terminal determines the beam ID and the at least part of the cell ID according to sequence information of the synchronization signal.

In the embodiments of the present disclosure, the terminal can determine the beam ID and the at least part of the cell ID according to the sequence information of the synchronization signal and thus the terminal determines the beam used when the subsequent signal is transmitted.

In combination with the first aspect or any one of the above possible implementation manners, in one possible implementation manner of the first aspect, the sequence information of the synchronization signal includes a sequence ID of the synchronization signal; and that the terminal determines the beam ID and the at least part of the cell ID according to the sequence information of the synchronization signal includes: the terminal determines the beam ID and the at least part of the cell ID according to the sequence ID of the synchronization signal, a preset total number of beams in each cell and a preset number of the at least parts of the cell ID.

In the embodiments of the present disclosure, the terminal can determine the beam ID and the at least part of the cell ID according to the sequence ID of the synchronization signal, a preset total number of the beams in each cell and a preset number of the at least parts of the cell ID and thus the terminal determines the beam used when the subsequent signal is transmitted.

In combination with the first aspect or any one of the above possible implementation manners, in one possible implementation manner of the first aspect, the synchronization signal includes a first synchronization signal and a second synchronization signal; and that the terminal determines the beam ID and the at least part of the cell ID according to the sequence information of the synchronization signal includes: the terminal determines the at least part of the cell ID according to sequence information of the first synchronization signal; and the terminal determines the beam ID according to sequence information of the second synchronization signal.

In the embodiments of the present disclosure, the terminal can respectively determine the beam ID and the at least part of the cell ID according to the sequence information of the first synchronization signal and the sequence information of the second synchronization signal and thus the terminal determines the beam used when the subsequent signal is transmitted.

In combination with the first aspect or any one of the above possible implementation manners, in one possible implementation manner of the first aspect, the synchronization signal includes a first synchronization signal and a second synchronization signal; and that the terminal determines the beam ID and the at least part of cell ID according to the synchronization signal includes: the terminal determines the at least part of the cell ID according to sequence information of the synchronization signal; and the terminal determines the beam ID according to a number of transmission time units spaced between a first transmission time unit and a second transmission time unit as well as a corresponding relationship between a number of transmission time units and a beam ID, where the first transmission time unit is a transmission time unit for transmitting the first synchronization signal, and the second transmission time unit is a transmission time unit for transmitting the second synchronization signal.

In the embodiments of the present disclosure, the terminal determines the at least part of the cell ID according to the sequence information of the synchronization signal and determines the beam ID according to a number of transmission time units spaced between the first transmission time unit and the second transmission time unit, and thus the terminal determines the beam used when the subsequent signal is transmitted.

In combination with the first aspect or any one of the above possible implementation manners, in one possible implementation manner of the first aspect, that the terminal determines the beam ID and the at least part of cell ID according to the synchronization signal includes: the terminal determines the at least part of the cell ID according to sequence information of the synchronization signal; and the terminal determines the beam ID according to a physical resource used for transmitting the synchronization signal as well as a corresponding relationship between physical resource and a beam ID.

In the embodiments of the present disclosure, the terminal determines the at least part of the cell ID according to the sequence information of the synchronization signal and determines the beam ID according to the physical resource used for transmitting the synchronization signal and thus the terminal determines the beam used when the subsequent signal is transmitted.

In combination with the first aspect or any one of the above possible implementation manners, in one possible implementation manner of the first aspect, that the terminal determines the beam ID and the at least part of cell ID according to the synchronization signal further includes: the terminal determines the beam ID and a first cell ID according to the synchronization signal, the first cell ID being one part of cell ID in an integral cell ID; and that the terminal transmits the subsequent signal according to the beam ID and/or the at least part of the cell ID includes: the terminal determines a second cell ID from a synchronization channel corresponding to the synchronization signal, the second cell ID and the first cell ID being formed into the integral cell ID; the terminal determines the integral cell ID according to the first cell ID and the second cell ID; and the terminal transmits the subsequent signal according to the beam ID and/or the integral cell ID.

In the embodiments of the present disclosure, the terminal determines the beam ID and the first cell ID according to the synchronization signal, determines the second cell ID from the synchronization channel corresponding to the synchronization channel and at last determines a cell used when the subsequent signal is transmitted and a beam in the cell and transmits the subsequent signal via the beam.

In combination with the first aspect or any one of the above possible implementation manners, in one possible implementation manner of the first aspect, that the terminal transmits the subsequent signal according to the beam ID and/or the at least part of the cell ID includes: the terminal determines, according to the beam ID and/or the at least part of the cell ID, a physical resource used for transmitting the subsequent signal; and the terminal transmits the subsequent signal on the physical resource.

In the embodiments of the present disclosure, the terminal transmits the subsequent signal according to the beam ID and the at least part of the cell ID and thus the terminal can transmit the subsequent signal via a beam used when the synchronization signal is received.

In combination with the first aspect or any one of the above possible implementation manners, in one possible implementation manner of the first aspect, that the terminal transmits the subsequent signal according to the beam ID and/or the at least part of the cell ID includes: the terminal generates a scrambling sequence according to the beam ID and/or the at least part of the cell ID; the terminal scrambles the subsequent signal according to the scrambling sequence; and the terminal transmits the scrambled subsequent signal.

In the embodiments of the present disclosure, the terminal can determine the scrambling sequence using the beam ID and the at least part of the cell ID and thus scramble the subsequent signal using the scrambling sequence.

In combination with the first aspect or any one of the above possible implementation manners, in one possible implementation manner of the first aspect, the subsequent signal includes a broadcast signal, a random access signal, a control signal, a reference signal and a data signal.

In the embodiments of the present disclosure, the terminal can transmit the subsequent broadcast signal, the random access signal, the control signal, the reference signal, the data signal and the like on a beam used for receiving the synchronization signal.

In combination with the first aspect or any one of the above possible implementation manners, in one possible implementation manner of the first aspect, the subsequent signal includes a preamble signal, and that the terminal transmits the subsequent signal according to the beam ID and/or the at least part of the cell ID includes: the terminal generates a preamble sequence according to the beam ID and/or the at least part of the cell ID; and the terminal transmits the preamble signal according to the preamble sequence.

In the embodiments of the present disclosure, the terminal can determine the preamble sequence using the beam ID and/or the at least part of the cell ID and thus transmit the preamble signal using the preamble sequence.

In combination with the first aspect or any one of the above possible implementation manners, in one possible implementation manner of the first aspect, the subsequent signal includes a pilot signal; and that the terminal transmits the subsequent signal according to the beam ID and/or the at least part of the cell ID includes: the terminal generates a pilot sequence according to the beam ID and/or the at least part of the cell ID; and the terminal transmits the pilot signal according to the pilot sequence.

In the embodiments of the present disclosure, the terminal can determine the pilot sequence by using the beam ID and/or the at least part of the cell ID and thus transmit the pilot signal using the pilot sequence.

A second aspect provides a signal transmission method, which includes: a network side device determines a cell Identifier ID and a beam ID; and the network side device sends a synchronization signal according to at least part of the cell ID and the beam ID.

In the embodiment of the present disclosure, the terminal can determine the beam ID and the at least part of the cell ID according to the synchronization signal and thus the terminal determines a beam used when a subsequent signal is transmitted.

In combination with the second aspect, in a possible implementation manner of the second aspect, the synchronization signal is one synchronization signal among multiple synchronization signals, and that the network side device sends the synchronization signal according to the beam ID and the at least part of the cell ID includes: the network side device sends the multiple synchronization signals via multiple beams according to the beam ID and the at least part of the cell ID, the synchronization signals sent via different beams being different.

In the embodiment of the present disclosure, by sending multiple different synchronization signals via multiple different beams, the terminal can determine the beam ID and the at least part of the cell ID according to the synchronization signal and thus the terminal determines the beam used when the subsequent signal is transmitted.

In combination with the second aspect or any one of the above possible implementation manners, in another possible implementation manner of the second aspect, that the network side device sends the synchronization signal according to the beam ID and the at least part of the cell ID includes: the network side device determines sequence information of the synchronization signal according to the beam ID and the at least part of the cell ID; and the network side device sends the synchronization signal generated based on the sequence information.

In the embodiment of the present disclosure, the terminal can determine the beam ID and the at least part of the cell ID according to the sequence information of the synchronization signal and thus the terminal determines the beam used when the subsequent signal is transmitted.

In combination with the second aspect or any one of the above possible implementation manners, in another possible implementation manner of the second aspect, the sequence information of the synchronization signal includes a sequence ID of the synchronization signal; and that the network side device determines sequence information of the synchronization signal according to the beam ID and the at least part of the cell ID includes: the network side device determines the sequence ID of the synchronization signal according to the at least part of the cell ID, the beam ID, a preset total number of beams in each cell and a number of the at least parts of the cell ID.

In the embodiment of the present disclosure, the terminal can determine the beam ID and the at least part of the cell ID according to the sequence ID of the synchronization signal, a preset total number of beams in each cell and a preset number of the at least parts of the cell ID, and thus the terminal determines the beam used when the subsequent signal is transmitted.

In combination with the second aspect or any one of the above possible implementation manners, in another possible implementation manner of the second aspect, the synchronization signal includes a first synchronization signal and a second synchronization signal; and that the network side device sends the synchronization signal according to the beam ID and the at least part of the cell ID includes: the network side device determines sequence information of the first synchronization signal according to the at least part of the cell ID and generates the first synchronization signal based on the sequence information of the first synchronization signal; the network side device determines sequence information of the second synchronization signal according to the beam ID and generates the second synchronization signal based on the sequence information of the second synchronization signal; and the network side device sends the first synchronization signal and the second synchronization signal.

In the embodiment of the present disclosure, the terminal can respectively determine the beam ID and the at least part of the cell ID according to the sequence information of the first synchronization signal and the sequence information of the second synchronization signal that are sent by the network side device and thus the terminal determines the beam used when the subsequent signal is transmitted.

In combination with the second aspect or any one of the above possible implementation manners, in another possible implementation manner of the second aspect, the sequence information of the synchronization signal includes a sequence ID of the synchronization signal; the synchronization signal includes a first synchronization signal and a second synchronization signal; and that the network side device sends the synchronization signal according to the beam ID and the at least part of the cell ID includes: the network side device determines a sequence ID of the first synchronization signal and a sequence ID of the second synchronization signal according to the at least part of the cell ID; the network side device generates the first synchronization signal according to the sequence ID of the first synchronization signal and generates the second synchronization signal according to the sequence ID of the second synchronization signal; the network side device determines a number of transmission time units spaced between a first transmission time unit and a second transmission time unit according to the beam ID; the network side device sends the first synchronization signal on the first transmission time unit; and after a period corresponding to the number of the transmission time units, the network side device sends the second synchronization signal on the second transmission time unit.

In the embodiment of the present disclosure, the terminal determines the at least part of the cell ID according to the sequence information of the synchronization signal, and determines the beam ID according to a number of transmission time units spaced between the first transmission time unit and the second transmission time unit, and thus the terminal determines the beam used when the subsequent signal is transmitted.

In combination with the second aspect or any one of the above possible implementation manners, in another possible implementation manner of the second aspect, that the network side device sends the synchronization signal according to the beam ID and the at least part of the cell ID further includes: the network side device sends the synchronization signal according to a first cell ID and the beam ID, the first cell ID being one part of cell ID in integral cell ID; and the method further includes: the network side device sends a second cell ID via a synchronization channel corresponding to the synchronization signal, the second cell ID and the first cell ID being formed into the integral cell ID.

In the embodiment of the present disclosure, the terminal determines the beam ID and the first cell ID according to the synchronization signal, determines the second cell ID from the synchronization channel corresponding to the synchronization signal, and at last determines a cell used when the subsequent signal is transmitted and a beam in the cell and transmits the subsequent signal via the beam.

In combination with the second aspect or any one of the above possible implementation manners, in another possible implementation manner of the second aspect, the method further includes: the network side device transmits the subsequent signal according to the beam ID and the at least part of the cell ID.

In the embodiment of the present disclosure, the network side device transmits the subsequence signal according to the beam ID and the at least part of the cell ID, so that the terminal receives the subsequent signal using a beam corresponding to the beam ID.

In combination with the second aspect or any one of the above possible implementation manners, in another possible implementation manner of the second aspect, that the network side device transmits the subsequent signal according to the beam ID and the at least part of the cell ID includes: the network side device generates a scrambling sequence according to the beam ID and the at least part of the cell ID; the network side device scrambles the subsequent signal according to the scrambling sequence; and the network side device transmits the scrambled subsequent signal.

In the embodiments of the present disclosure, the scrambling sequence can be determined by using the beam ID and the at least part of the cell ID and thus the subsequent signal is scrambled using the scrambling sequence.

In combination with the second aspect or any one of the above possible implementation manners, in another possible implementation manner of the second aspect, the subsequent signal includes a broadcast signal, a control signal, a reference signal and a data signal.

In the embodiments of the present disclosure, the subsequent signal such as the broadcast signal, the random access signal, the control signal, the reference signal, the data signal and the like can be transmitted on the beam used for receiving the synchronization signal.

In combination with the second aspect or any one of the above possible implementation manners, in another possible implementation manner of the second aspect, that the network side device transmits the subsequent signal according to the beam ID and the at least part of the cell ID includes: the network side device determines a physical resource used for transmitting the subsequent signal according to the beam ID and the at least part of the cell ID; and the network side device transmits the subsequent signal on the physical resource.

In the embodiments of the present disclosure, the physical resource for transmitting the subsequent signal is determined according to the beam ID and the at least part of the cell ID and thus the subsequent signal is transmitted on the physical resource.

In combination with the second aspect or any one of the above possible implementation manners, in another possible implementation manner of the second aspect, the subsequent signal includes a pilot signal, and that the network side device transmits the subsequent signal according to the beam ID and the at least part of the cell ID includes: the network side device generates a pilot sequence according to the beam ID and the at least part of the cell ID; and the network side device transmits the pilot signal according to the pilot sequence.

In the embodiments of the present disclosure, the pilot sequence can be determined by using the beam ID and the at least part of the cell ID and thus the pilot signal is transmitted using the pilot sequence.

A third aspect provides a signal transmission device, which includes a module configured to execute the method in the first aspect.

A fourth aspect provides a signal transmission device, which includes a module configured to execute the method in the second aspect.

A fifth aspect provides a signal transmission device, which includes a memory, a processor, an input/output interface, a communication interface and a bus system. Herein, the memory, the processor, the input/output interface and the communication interface are connected via the bus system; the memory is configured to store an instruction; the processor is configured to execute the instruction stored by the memory; and when the instruction is executed, the processor executes the method in the first aspect via the communication interface, and controls the input/output interface to receive input data and information and output data such as an operation result.

A sixth aspect provides a signal transmission device, which includes a memory, a processor, an input/output interface, a communication interface and a bus system. Herein, the memory, the processor, the input/output interface and the communication interface are connected via the bus system; the memory is configured to store an instruction; the processor is configured to execute the instruction stored by the memory; and when the instruction is executed, the processor executes the method in the second aspect via the communication interface, and controls the input/output interface to receive input data and information and output data such as an operation result.

A seventh aspect provides a computer readable storage medium; the computer readable storage medium is configured to store a program code of a signal detection method, and the program code is configured to execute the instruction of the method in the first aspect.

An eighth aspect provides a computer readable storage medium; the computer readable storage medium is configured to store a program code of a signal detection method, and the program code is configured to execute the instruction of the method in the first aspect.

BRIEF DESCRIPTION OF THE DRAWINGS

In order to describe the technical solutions in the embodiments of the present disclosure more clearly, a simple introduction on the accompanying drawings which are needed in the description of the embodiments is given below. Apparently, the accompanying drawings in the description below are merely some of the embodiments of the present disclosure, based on which other drawings may be obtained by those of ordinary skill in the art without any creative effort.

DETAILED DESCRIPTION OF THE EMBODIMENTS

Figure 1:
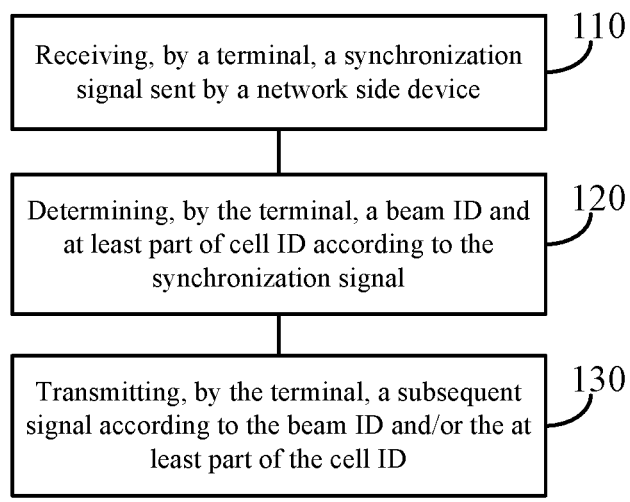
FIG. 1 illustrates a schematic flowchart of a signal transmission method according to an embodiment of the present disclosure.

A clear and complete description of the technical solutions in the present disclosure will be given below, in combination with the accompanying drawings in the embodiments of the present disclosure. Apparently, the embodiments described below are a part, but not all, of the embodiments of the present disclosure. All of the other embodiments, obtained by those of ordinary skill in the art based on the embodiments of the present disclosure without any inventive efforts, fall into the protection scope of the present disclosure.

It should be understood that the technical solutions of the present disclosure can be applied in various communications systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, and particularly a 4.5G LTE evolutional system and a 5G New Radio (NR) wireless communication system.

It should be further understood that the terminal may be referred to a terminal device or User Equipment (UE) and may also be referred to a mobile terminal and a mobile UE, etc. The terminal may communicate with one or more core networks using a Radio Access Network (RAN). The UE may be a mobile terminal such as a mobile telephone (or referred to as a "cellular" phone) or a computer having the mobile terminal. For example, the UE may also be a portable, pocket-sized, handheld, computer built-in, or in-vehicle mobile device that exchange a language and/or a data with the RAN.

It should be further understood that the network side device may be a device for communicating with a mobile device. The network device may be an Access Point (AP) in a Wireless Local Area Network (WLAN), a Base Transceiver Station (BTS) in a GSM or CDMA, may also be a Node B (NB) in a WCDMA and may further be an Evolutional Node B (eNB or eNodeB) in an LTE, or a relay station or an AP, or a vehicle-mounted device, a wearable device and a network device in a future 5G network or a network device in a future evolutional Public Land Mobile Network (PLMN), etc.

In addition, in the embodiments of the present disclosure, the network side device (such as the eNB) may be a macro eNB and may also be an eNB for providing a small cell. Herein, the small cell may include a metro cell, a micro cell, a pico cell and a femto cell, etc., all of small cells have the characteristics of small coverage range and low transmitting power and are applied to provide a high-rate data transmission service.

At present, it is proposed in a 5G system that multiple beams (such as a narrow beam) may be adopted to transmit a public signal in a cell. However, a terminal cannot determine the public signal is obtained through which beam in the cell when the cell is accessed so that the beam is used in the subsequent signal transmission process.

In order to solve the above problem, an embodiment of the present disclosure will be described below in detail in combination with FIG. 1.

FIG. 1 illustrates a schematic flowchart of a signal transmission method according to an embodiment of the present disclosure. As shown in FIG. 1, the method may include the following blocks.

At 110, a terminal receives a synchronization signal sent by a network side device.

In at least one alternative embodiment, the synchronization signal is one of multiple different synchronization signals sent by the network side device using different beams.

The synchronization signal may be a downlink signal used by the terminal for synchronizing with the network side device to determine downlink timing and a transmitting frequency point. The synchronization signal may include a Primary Synchronization Signal (PSS), a Secondary Synchronization Signal (SSS), Cell-specific Reference Signals (CRS) and a Beam Reference Signal (BRS).

At 120, the terminal determines a beam ID and at least part of cell ID according to the synchronization signal.

In at least one alternative embodiment, the at least part of the cell ID may be an integral cell ID or one part of cell ID in the integral cell ID. For example, the integral cell ID may include a cell group ID and a cell ID within a cell group. The at least part of the cell ID may be the cell group ID or the cell ID within the cell group. The integral cell ID may further comprise a cell ID1 and a cell ID2 and the at least part of the cell ID may be the cell ID1 or the cell ID2.

It is to be noted that the beam ID may be combined with the at least part of the cell ID to indicate one beam. For example, the beam ID is 1 and the cell ID is 3, which may determine a beam whose beam ID is 1 in a cell 3.

In at least one alternative embodiment, the terminal determines the beam ID and the at least part of the cell ID according to sequence information of the synchronization signal.

It should be understood that the sequence information of the synchronization signal may be a sequence ID of the synchronization signal and may further be other information relevant to a sequence for generating the synchronization signal, which is not specifically defined hereto by this embodiment of the present disclosure.

It is to be noted that the sequence information of the synchronization signal may be obtained by enabling the terminal to perform a blind test on the synchronization signal, the sequence information may be determined by enabling the terminal to perform the blind test on the PSS, the sequence information may further be determined by enabling the terminal to perform the blind test on the SSS, and the sequence information may further be determined by enabling the terminal to perform the blind test on the PSS and the SSS. In the embodiment of the present disclosure, the manner for determining the sequence information is not specifically defined.

For example, the terminal may determine the sequence ID1 of the synchronization signal by performing the blind test on the PSS and determine the sequence ID2 of the synchronization signal by performing the blind test on the SSS; and the terminal may determine the sequence ID of the synchronization signal via the ID1 and the ID2 (for instance, the sequence ID of the synchronization signal=ID1\*ID2).

The terminal and the network side device may appoint a corresponding relationship among the sequence ID of the synchronization signal, the sequence ID1 of the synchronization signal and the sequence ID2 of the synchronization signal in advance (that is, an appointed mapping relationship is adopted), and the terminal may determine the sequence ID of the synchronization signal according to the sequence ID1 of the synchronization signal and the sequence ID2 of the synchronization signal.

It should be further understood that the terminal may determine the at least part of the cell ID by performing the blind test on synchronization signal. For example, the terminal may determine the ID within the cell group by performing the blind test on the PSS and determine the cell group ID by performing the blind test on the SSS. The terminal may further determine the ID within the cell group (that is, a part of cell ID) merely by performing the blind test on the PSS, which is not specifically defined hereto by this embodiment of the present disclosure.

In at least one alternative embodiment, the sequence information of the synchronization signal includes a sequence ID of the synchronization signal; and that the terminal determines the beam ID and the at least part of the cell ID according to sequence information of the synchronization signal includes: the terminal determines the beam ID and the at least part of the cell ID according to the sequence ID of the synchronization signal, a preset total number of beams in each cell and a preset number of the at least part of the cell ID.

In at least one alternative embodiment, that the terminal determines the beam ID and the at least part of the cell ID according to the sequence ID of the synchronization signal, a preset total number of beams in each cell and a preset number of the at least part of the cell ID includes: the terminal determines the at least part of the cell ID k according to $\lfloor N/M \rfloor$ and the terminal determines the beam ID m according to m=N mod M, where the N represents the sequence ID of the synchronization signal and the M represents the total number of beams in each cell.

In at least one alternative embodiment, that the terminal determines the beam ID and the at least part of the cell ID according to the sequence ID of the synchronization signal, a preset total number of beams in each cell and a preset number of the at least parts of the cell ID includes: the terminal determines the beam ID k according to k=N mod K, and the terminal determines the at least part of the cell ID m according to $\lfloor N/K \rfloor$, where the N represents the sequence ID of the synchronization signal and the K represents the preset number of the at least part of the cell ID.

For example, the N in the above formula may be 504, the M may be 8 or 4 and the K may be 63 or 126. The values of the parameters in the above formula are not specifically defined by this embodiment of the present disclosure.

In at least one alternative embodiment, the synchronization signal includes a first synchronization signal and a second synchronization signal; and that the terminal determines the beam ID and the at least part of the cell ID according to sequence information of the synchronization signal includes: the terminal determines the at least part of the cell ID according to sequence information of the first synchronization signal; and the terminal determines the beam ID according to sequence information of the second synchronization signal.

It is to be noted that the sequence information of the second synchronization signal or a physical resource used for transmitting the second synchronization signal may be determined by the at least part of the cell ID that is obtained by performing the blind test on the first synchronization signal.

It should be understood that the first synchronization signal may be the PSS or the SSS, and the second synchronization signal may be the CRS or the BRS; or, the first synchronization signal may be the PSS and the second synchronization signal may be the SSS. The types of the first synchronization signal and the second synchronization signal are not specifically defined by this embodiment of the present disclosure.

In at least one alternative embodiment, the synchronization signal includes a first synchronization signal and a second synchronization signal; and that the terminal determines the beam ID and the at least part of cell ID according to the synchronization signal includes: the terminal determines the at least part of the cell ID according to sequence information of the synchronization signal; and the terminal determines the beam ID according to a number of transmission time units spaced between a first transmission time unit and a second transmission time unit as well as a corresponding relationship between a number of transmission time units and a beam ID, where the first transmission time unit is a transmission time unit for transmitting the first synchronization signal, and the second transmission time unit is a transmission time unit for transmitting the second synchronization signal.

In at least one alternative embodiment, the transmission time unit may be a transmission unit such as a sub-frame, an Orthogonal Frequency Division Multiplexing (OFDM) symbol, a time slot, a shortened time slot and a shortened sub-frame.

For example, when m OFDM symbols are spaced between the OFDM symbol for transmitting the first synchronization signal and the OFDM symbol for transmitting the second synchronization signal, the beam ID may be m-p, where the p may be a preset positive integer; and when m sub-frames are spaced between the sub-frame for transmitting the first synchronization signal and the sub-frame for transmitting the second synchronization signal, the beam ID may be m−1.

It should be understood that the first synchronization signal may be the PSS or the SSS, and the second synchronization signal may be the CRS or the BRS; or, the first synchronization signal may be the PSS and the second synchronization signal may be the SSS. The types of the first synchronization signal and the second synchronization signal are not specifically defined by this embodiment of the present disclosure.

It should be further understood that the corresponding relationship between the number of the transmission time units and the beam ID may be configured by the terminal in advance, and may further be sent by the network side device to the terminal, which is not specifically defined by this embodiment of the present disclosure.

In at least one alternative embodiment, that the terminal determines the beam ID and the at least part of cell ID according to the synchronization signal includes: the terminal determines the at least part of the cell ID according to sequence information of the synchronization signal; and the terminal determines the beam ID according to a physical resource used for transmitting the synchronization signal as well as a corresponding relationship between the physical resource and the beam ID.

In at least one alternative embodiment, the corresponding relationship between the physical resource and the beam ID may be a corresponding relationship between a time-domain physical resource index and the beam ID or a corresponding relationship between a frequency-domain physical resource index and the beam ID, and may further be a corresponding relationship between a time-frequency physical resource index and the beam ID, in which the corresponding relationship is not specifically defined by this embodiment of the present disclosure.

It should be understood that the first synchronization signal may be any one signal of the SSS, the CRS or the BRS, which is not specifically defined hereto by this embodiment of the present disclosure.

At 130, the terminal transmits a subsequent signal according to the beam ID and/or the at least part of the cell ID.

In at least one alternative embodiment, that the terminal transmits the subsequent signal may refer to that the terminal receives the subsequent signal or the terminal sends the subsequent signal. That is, the subsequent signal may be a downlink signal and may further be an uplink signal.

That the terminal transmits the subsequent signal according to the beam ID and/or the at least part of the cell ID may refer to that the terminal, according to the beam ID and/or the at least part of the cell ID, transmits the subsequent signal using a beam corresponding to the beam ID.

It is to be noted that the terminal may select a beam with good quality for transmitting the signal from beams used for transmitting the above multiple synchronization signals as the beam used for transmitting the subsequent signal, where the beam with good quality for transmitting the signal may be a beam with the quality for transmitting the signal greater than a preset threshold value.

It should be understood that the above multiple beams may be multiple beams in one cell.

In this embodiment of the present disclosure, the terminal may transmit different synchronization signals by multiple beams to select the beam with good quality for transmitting a signal to transmit the subsequent signal, thereby obtaining the beamforming gain and improving the signal transmission quality.

In at least one alternative embodiment, the block 120 may further include: the terminal determines the beam ID and a first cell ID according to the synchronization signal, the first cell ID being one part of cell ID in an integral cell ID; and the block 130 may include: the terminal determines a second cell ID from a synchronization channel corresponding to the synchronization signal, the second cell ID and the first cell ID being formed into the integral cell ID; the terminal determines the integral cell ID according to the first cell ID and the second cell ID; and the terminal transmits the subsequent signal according to the beam ID and/or the integral cell ID.

In at least one alternative embodiment, the synchronization channel corresponding to the synchronization signal may refer to that a scrambling sequence used by the synchronization channel for transmitting a signal may be generated using a sequence ID carried by the synchronization signal; or fixed relative positions are provided between a physical resource position used for transmitting the synchronization signal and a physical resource position corresponding to the synchronization channel. For example, a fixed time offset is provide between a transmission time unit for transmitting the above synchronization signal and a transmission time unit corresponding to the synchronization channel.

For example, the synchronization signal may carry a cell ID k and a beam ID m, and the terminal may generate a scrambling sequence for the synchronization channel (such as a Physical Broadcast Channel (PBCH)) corresponding to the synchronization signal based on any one parameter in k, m and p=k*m.

The terminal may determine a first cell ID N1 by detecting the synchronization signal and determine a second cell ID N2 from the synchronization channel corresponding to the synchronization signal, so that the integral cell ID k=N1*N2 is obtained.

It should be understood that the synchronization channel may be a PBCH, a Physical Sidelink Broadcast Channel (PSBCH) and the like.

In at least one alternative embodiment, that the terminal transmits the subsequent signal according to the beam ID and/or the at least part of the cell ID includes: the terminal determines a physical resource used for transmitting the subsequent signal according to the beam ID and/or the at least part of the cell ID; and the terminal transmits the subsequent signal on the physical resource.

In at least one alternative embodiment, the terminal may determine index information of the physical resource used for transmitting the subsequent signal according to the beam ID and/or the at least part of the cell ID, the index information being at least one of a time-domain resource index, a frequency-domain resource index and a time-frequency resource index, and thus the terminal determines the physical resource used for transmitting the subsequent signal according to the index information.

In at least one alternative embodiment, the block 130 may further include: the terminal generates a scrambling sequence according to the beam ID and/or the at least part of the cell ID; the terminal scrambles the subsequent signal according to the scrambling sequence; and the terminal transmits the scrambled subsequent signal.

For example, the synchronization signal may carry a part of cell ID N1 and a beam ID m and a synchronization channel associated with the synchronization signal carries the rest part of cell ID N2, and thus the integral cell ID k=N1*N2 is obtained; the terminal generates a Channel Status Information Reference Signal (CSI-RS) sequence based on the cell ID k or the beam ID m or the p=k*m and receives the CSI-RS using the CSI-RS sequence, thus performing mobility measurement.

In at least one alternative embodiment, the subsequent signal includes a broadcast signal, a random access signal, a control signal, a reference signal and a data signal.

In at least one alternative embodiment, the broadcast signal may be a broadcast signal sent by a PBCH, the random access signal may be a random access signal sent by a Physical Random Access Channel (PRACH), the control signal may be a control signal sent by a Physical Uplink Control Channel (PUCCH) or a Physical Downlink Control Channel (PDCCH), and the reference signal may be a Sounding Reference Signal (SRS), a CSI-RS, a CRS, a Demodulation Reference Signal (DMRS), and a BRS, etc.

In at least one alternative embodiment, the subsequent signal includes a preamble signal, and that the terminal transmits the subsequent signal according to the beam ID and/or the at least part of the cell ID includes: the terminal generates a preamble sequence according to the beam ID and/or the at least part of the cell ID; and the terminal transmits the preamble signal according to the preamble sequence.

In at least one alternative embodiment, the subsequent signal includes a pilot signal; and that the terminal transmits the subsequent signal according to the beam ID and/or the at least part of the cell ID includes: the terminal generates a pilot sequence according to the beam ID and/or the at least part of the cell ID; and the terminal transmits the pilot signal according to the pilot sequence.

Figure 2:
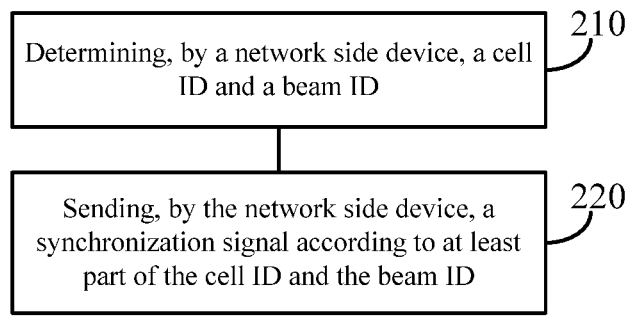
FIG. 2 illustrates a schematic flowchart of a signal transmission method according to another embodiment of the present disclosure.

FIG. 2 illustrates a schematic flowchart of a signal transmission method according to another embodiment of the present disclosure. It should be understood that the specific details of the method shown in FIG. 2 are similar to those of the method shown in FIG. 1 and will not be repeated herein for the briefness. As shown in FIG. 2, the method may include the following blocks.

At 210, a network side device determines a cell ID and a beam ID.

In at least one alternative embodiment, the network side device determines the integral cell ID and the beam ID.

At 220, the network side device sends a synchronization signal according to at least part of the cell ID and the beam ID.

In at least one alternative embodiment, the network side device may send multiple different synchronization signals via multiple beams, and each synchronization signal in the multiple synchronization signals is in one-to-one correspondence with the multiple beams.

It should be understood that the at least part of the cell ID may be any one part of the integral cell ID, and may be, for example, a cell group ID and an ID within a cell group in the integral cell ID, which is not specifically defined hereto by this embodiment of the present disclosure.

In at least one alternative embodiment, the synchronization signal is one synchronization signal among multiple synchronization signals, and that the network side device sends the synchronization signal according to the beam ID and the at least part of the cell ID includes: the network side device sends the multiple synchronization signals via multiple beams according to the beam ID and the at least part of the cell ID, the synchronization signals sent via different beams being different.

In at least one alternative embodiment, that the network side device sends the synchronization signal according to the beam ID and the at least part of the cell ID includes: the network side device determines sequence information of the synchronization signal according to the beam ID and the at least part of the cell ID; and the network side device sends the synchronization signal generated based on the sequence information.

In at least one alternative embodiment, the sequence information of the synchronization signal includes a sequence ID of the synchronization signal; and that the network side device determines sequence information of the synchronization signal according to the beam ID and the at least part of the cell ID includes: the network side device determines the sequence ID of the synchronization signal according to the at least part of the cell ID, the beam ID, a preset total number of beams in each cell and a preset total number of cells.

In at least one alternative embodiment, the synchronization signal includes a first synchronization signal and a second synchronization signal; and that the network side device sends the synchronization signal according to the beam ID and the at least part of the cell ID includes: the network side device determines sequence information of the first synchronization signal according to the at least part of the cell ID and generates the first synchronization signal based on the sequence information of the first synchronization signal; the network side device determines sequence information of the second synchronization signal according to the beam ID and generates the second synchronization signal based on the sequence information of the second synchronization signal; and the network side device sends the first synchronization signal and the second synchronization signal.

In at least one alternative embodiment, the sequence information of the synchronization signal includes a sequence ID of the synchronization signal; the synchronization signal includes a first synchronization signal and a second synchronization signal; and that the network side device sends the synchronization signal according to the beam ID and the at least part of the cell ID includes: the network side device determines a sequence ID of the first synchronization signal and a sequence ID of the second synchronization signal according to the at least part of the cell ID; the network side device generates the first synchronization signal according to the sequence ID of the first synchronization signal and generates the second synchronization signal according to the sequence ID of the second synchronization signal; the network side device determines a number of transmission time units spaced between a first transmission time unit and a second transmission time unit according to the beam ID; the network side device sends the first synchronization signal on the first transmission time unit; and after a period corresponding to the number of transmission time units spaced, the network side device sends the second synchronization signal on the second transmission time unit.

In at least one alternative embodiment, that the network side device sends the synchronization signal according to the beam ID and the at least part of the cell ID further includes: the network side device sends the synchronization signal according to the first cell ID and the beam ID, the first cell ID being one part of cell ID in the integral cell ID; and the method further includes: the network side device sends the second cell ID via a synchronization channel corresponding to the synchronization signal, the second cell ID and the first cell ID being formed into the integral cell ID.

In at least one alternative embodiment, the method further includes: the network side device transmits the subsequent signal according to the beam ID and the at least part of the cell ID.

In at least one alternative embodiment, that the network side device transmits the subsequent signal according to the beam ID and the at least part of the cell ID includes: the network side device generates a scrambling sequence according to the beam ID and the at least part of the cell ID; the network side device scrambles the subsequent signal according to the scrambling sequence; and the network side device transmits the scrambled subsequent signal.

In at least one alternative embodiment, the subsequent signal includes a broadcast signal, a control signal, a reference signal and a data signal.

In at least one alternative embodiment, that the network side device transmits the subsequent signal according to the beam ID and the at least part of the cell ID includes: the network side device determines a physical resource used for transmitting the subsequent signal according to the beam ID and the at least part of the cell ID; and the network side device transmits the subsequent signal on the physical resource.

In at least one alternative embodiment, the subsequent signal includes a pilot signal, and that the network side device transmits the subsequent signal according to the beam ID and the at least part of the cell ID includes: the network side device generates a pilot sequence according to the beam ID and the at least part of the cell ID; and the network side device transmits the pilot signal according to the pilot sequence.

The signal transmission method according to the embodiments of the present disclosure is described above in detail in combination with FIG. 1 and FIG. 2. Hereinafter, a signal transmission device according to the embodiments of the present disclosure will be described in detail in combination with FIG. 3 to FIG. 6. It should be understood that the device shown in FIG. 3 and FIG. 5 may implement each block in FIG. 1 and the device shown in FIG. 4 and FIG. 6 may implement each block in FIG. 2, all of which will not be repeated in detail for the avoidance of the repetition.

Figure 3:
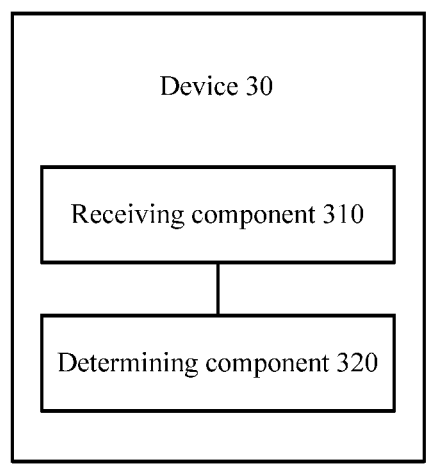
FIG. 3 illustrates a schematic block diagram of a signal transmission device according to an embodiment of the present disclosure.

FIG. 3 illustrates a schematic block diagram of a signal transmission device according to an embodiment of the present disclosure. The device shown in FIG. 3 may be a terminal. The device 300 shown in FIG. 3 may include a receiving component 310, a determining component 320 and a transmitting component 330.

The receiving component 310 is configured to receive a synchronization signal sent by a network side device.

The determining component 320 is configured to determine a beam ID and at least part of cell ID according to the synchronization signal received by the receiving component.

The transmitting component 330 is configured to transmit a subsequent signal according to the beam ID and/or the at least part of the cell ID determined by the determining component.

In at least one alternative embodiment, the determining component is further configured to: determine the beam ID and the at least part of the cell ID according to sequence information of the synchronization signal.

In at least one alternative embodiment, the sequence information of the synchronization signal includes a sequence ID of the synchronization signal; and the determining component is further configured to: determine the beam ID and the at least part of the cell ID according to the sequence ID of the synchronization signal, a preset total number of beams in each cell and a preset number of the at least part of the cell ID.

In at least one alternative embodiment, the synchronization signal includes a first synchronization signal and a second synchronization signal; and the determining component is further configured to: determine the at least part of the cell ID according to sequence information of the first synchronization signal; and determine the beam ID according to sequence information of the second synchronization signal.

In at least one alternative embodiment, the synchronization signal includes a first synchronization signal and a second synchronization signal; and the determining component is further configured to: determine the at least part of the cell ID according to sequence information of the synchronization signal; and determine the beam ID according to a number of transmission time units spaced between a first transmission time unit and a second transmission time unit as well as a corresponding relationship between a number of transmission time units and the beam ID, where the first transmission time unit is a transmission time unit for transmitting the first synchronization signal, and the second transmission time unit is a transmission time unit for transmitting the second synchronization signal.

In at least one alternative embodiment, the determining component is further configured to: determine the at least part of the cell ID according to sequence information of the synchronization signal; and determine the beam ID according to a physical resource used for transmitting the synchronization signal as well as a corresponding relationship between the physical resource and the beam ID.

In at least one alternative embodiment, the determining component is further configured to: determine the beam ID and a first cell ID according to the synchronization signal, the first cell ID being one part of cell ID in an integral cell ID; and the transmitting component is further configured to: determine a second cell ID from a synchronization channel corresponding to the synchronization signal, the second cell ID and the first cell ID being formed into the integral cell ID; determine the integral cell ID according to the first cell ID and the second cell ID; and transmit the subsequent signal according to the beam ID and/or the integral cell ID.

In at least one alternative embodiment, the transmitting component is further configured to: determine a physical resource used for transmitting the subsequent signal according to the beam ID and/or the at least part of the cell ID; and transmit the subsequent signal on the physical resource.

In at least one alternative embodiment, the transmitting component is further configured to: generate a scrambling sequence according to the beam ID and/or the at least part of the cell ID; scramble the sequence signal according to the scrambling sequence; and transmit the scrambled subsequent signal.

In at least one alternative embodiment, the subsequent signal includes a broadcast signal, a random access signal, a control signal, a reference signal and a data signal.

In at least one alternative embodiment, the subsequent signal includes a preamble signal; and the transmitting component is further configured to: generate a preamble sequence according to the beam ID and/or the at least part of the cell ID; and transmit the preamble signal according to the preamble sequence.

In at least one alternative embodiment, the subsequent signal includes a pilot signal; and the transmitting component is further configured to: generate a pilot sequence according to the beam ID and/or the at least part of the cell ID; and transmit the pilot signal according to the pilot sequence.

In at least one alternative embodiment, the cell ID comprises an integral cell ID.

Figure 4:
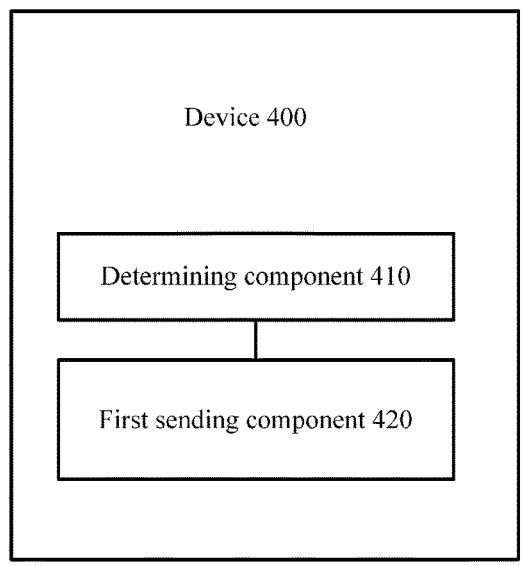
FIG. 4 illustrates a schematic block diagram of a signal transmission device according to another embodiment of the present disclosure.

FIG. 4 illustrates a schematic block diagram of a signal transmission device according to another embodiment of the present disclosure. The device shown in FIG. 4 may be a network side device. The device shown in FIG. 4 may include a determining component 410 and a first sending component 420.

The determining component 410 is configured to determine a cell ID and a beam ID.

The first sending component 420 is configured to send a synchronization signal according to at least part of the cell ID and the beam ID.

In at least one alternative embodiment, the synchronization signal is one synchronization signal among multiple synchronization signals; and the first sending component is configured to: send the multiple synchronization signals via multiple beams according to the beam ID and the at least part of the cell ID, the synchronization signals sent via different beams being different.

In at least one alternative embodiment, the first sending component is configured to: determine sequence information of the synchronization signal according to the beam ID and the at least part of the cell ID; and send the synchronization signal generated based on the sequence information.

In at least one alternative embodiment, the sequence information of the synchronization signal includes a sequence ID of the synchronization signal; and the determining component is configured to: determine the sequence ID of the synchronization signal according to the at least part of the cell ID, the beam ID, a preset total number of beams in each cell and a number of the at least part of the cell ID.

In at least one alternative embodiment, the synchronization signal includes a first synchronization signal and a second synchronization signal; and the first sending component is configured to: determine sequence information of the first synchronization signal according to the at least part of the cell ID and generate the first synchronization signal based on the sequence information of the first synchronization signal; determine sequence information of the second synchronization signal according to the beam ID and generate the second synchronization signal based on the sequence information of the second synchronization signal; and send the first synchronization signal and the second synchronization signal.

In at least one alternative embodiment, the sequence information of the synchronization signal includes a sequence ID of the synchronization signal; the synchronization signal includes a first synchronization signal and a second synchronization signal; and the first sending component is configured to: determine a sequence ID of the first synchronization signal and a sequence ID of the second synchronization signal according to the at least part of the cell ID; generate the first synchronization signal according to the sequence ID of the first synchronization signal and generate the second synchronization signal according to the sequence ID of the second synchronization signal; determine a number of transmission time units spaced between a first transmission time unit and a second transmission time unit according to the beam ID; send the first synchronization signal on the first transmission time unit; and send, after a period corresponding to the number of the transmission time units, the second synchronization signal on the second transmission time unit.

In at least one alternative embodiment, the first sending component is configured to: send the synchronization signal according to the first cell ID and the beam ID, the first cell ID being one part of cell ID in an integral cell ID; and the device further includes: a second sending component, configured to send the second cell ID via a synchronization channel corresponding to the synchronization signal, the second cell ID and the first cell ID being formed into the integral cell ID.

In at least one alternative embodiment, the device further includes: a transmitting component, configured to transmit the subsequent signal according to the beam ID and the at least part of the cell ID.

In at least one alternative embodiment, the transmitting component is configured to: generate a scrambling sequence according to the beam ID and the at least part of the cell ID; scramble the subsequent signal according to the scrambling sequence; and transmit the scrambled subsequent signal.

In at least one alternative embodiment, the subsequent signal includes a broadcast signal, a control signal, a reference signal and a data signal.

In at least one alternative embodiment, the transmitting component is configured to: determine a physical resource used for transmitting the subsequent signal according to the beam ID and the at least part of the cell ID; and transmit the subsequent signal on the physical resource.

In at least one alternative embodiment, the subsequent signal includes a pilot signal; and the transmitting component is configured to: generate a pilot sequence according to the beam ID and the at least part of the cell ID; and transmit the pilot signal according to the pilot sequence.

In at least one alternative embodiment, the cell ID comprises an integral cell ID.

Figure 5:
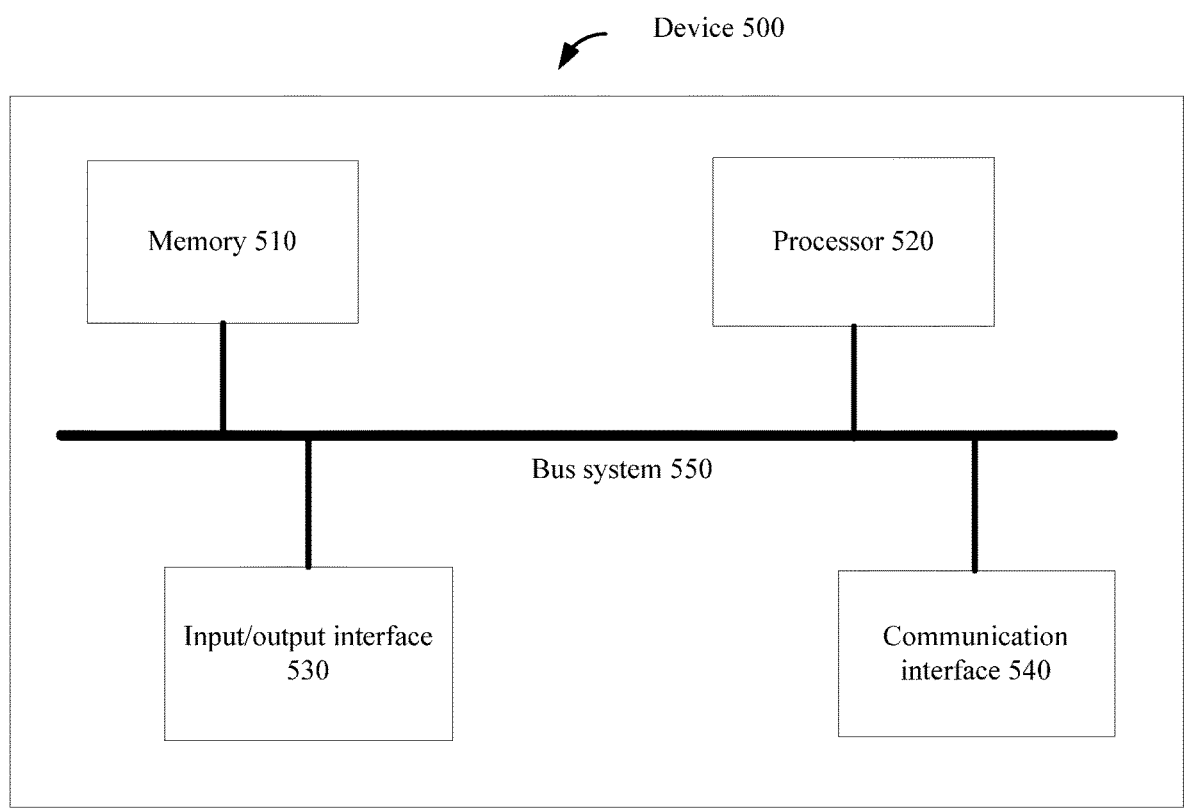
FIG. 5 illustrates a schematic block diagram of a signal transmission device according to another embodiment of the present disclosure.

FIG. 5 illustrates a schematic block diagram of a signal transmission device according to another embodiment of the present disclosure. The device 500 shown in FIG. 5 includes: a memory 510, a processor 520, an input/output interface 530, a communication interface 540 and a bus system 550. Herein, the memory 510, the processor 520, the input/output interface 530 and the communication interface 540 are connected via the bus system 550. The memory 510 is configured to store an instruction. The processor 520 is configured to execute the instruction stored by the memory 520 so as to control the input/output interface 530 to receive input data and information, output data such as an operation result and control the communication interface 540 to send a signal.

The communication interface 540 is configured to receive a synchronization signal sent by a network side device.

The processor 520 is configured to determine a beam ID and at least part of cell ID according to the synchronization signal.

The communication interface 540 is configured to transmit a subsequent signal according to the beam ID and/or the at least part of cell ID.

It should be understood that, in this embodiment of the present disclosure, the processor 520 may be a universal Central Processing Unit (CPU), a microprocessor, an Application Specific Integrated Circuit (ASIC), or one or more integrated circuits, and is configured to execute a related procedure to implement the technical solutions provided by this embodiment of the present disclosure.

It should be further understood that, the communication interface 540 employs, for example but is not limited to, a transmitter-receiver device such as a transmitter-receiver to implement the communication between the device 500 for the signal detection and other devices or communication networks.

The memory 510 may include a Read-Only Memory (ROM) and a Random-Access Memory (RAM) and provides instructions and data for the processor 520. A part of the processor 520 may further include a nonvolatile random access memory. For example, the processor 520 may further store information on a type of a storage device.

Beside a data bus, the bus system 550 may further include a power bus, a control bus and a state signal bus, etc. For clarity of description, various buses in the figure all are marked as the bus system 550.

In an implementation process, the blocks in the foregoing methods may be completed using an integrated logic circuit of hardware or an instruction in a form of software in the processor 520. Blocks of the signal transmission methods disclosed with reference to the embodiments of the present disclosure may be directly executed and accomplished by means of a hardware processor, or may be executed and accomplished using a combination of hardware and software modules in the processor. The software module may be located in a mature storage medium in the art, such as a RAM, a flash memory, a ROM, a programmable ROM (PROM), an electrically erasable PROM (EEPROM) or a register. The storage medium is located in the memory 510. The processor 520 reads information from the memory 510 and completes the blocks of the foregoing methods in combination with the hardware. To avoid repetition, details are not described herein again.

In at least one alternative embodiment, the processor is further configured to: determine the beam ID and the at least part of the cell ID according to sequence information of the synchronization signal.

In at least one alternative embodiment, the sequence information of the synchronization signal includes a sequence ID of the synchronization signal; and the processor is further configured to: determine the beam ID and the at least part of the cell ID according to the sequence ID of the synchronization signal, a preset total number of beams in each cell and a preset number of the at least part of the cell ID.

In at least one alternative embodiment, the synchronization signal includes a first synchronization signal and a second synchronization signal; and the processor is further configured to: determine the at least part of the cell ID according to sequence information of the first synchronization signal; and determine the beam ID according to sequence information of the second synchronization signal.

In at least one alternative embodiment, the synchronization signal includes a first synchronization signal and a second synchronization signal; and the processor is further configured to: determine the at least part of the cell ID according to sequence information of the synchronization signal; and determine the beam ID according to a number of transmission time units spaced between a first transmission time unit and a second transmission time unit as well as a corresponding relationship between a number of transmission time units and the beam ID, where the first transmission time unit is a transmission time unit for transmitting the first synchronization signal, and the second transmission time unit is a transmission time unit for transmitting the second synchronization signal.

In at least one alternative embodiment, the processor is further configured to: determine the at least part of the cell ID according to sequence information of the synchronization signal; and determine the beam ID according to a physical resource used for transmitting the synchronization signal as well as a corresponding relationship between the physical resource and the beam ID.

In at least one alternative embodiment, the processor is further configured to: determine the beam ID and a first cell ID according to the synchronization signal, the first cell ID being one part of cell ID in an integral cell ID; and the communication interface is further configured to: determine a second cell ID from a synchronization channel corresponding to the synchronization signal, the second cell ID and the first cell ID being formed into the integral cell ID; determine the integral cell ID according to the first cell ID and the second cell ID; and transmit the subsequent signal according to the beam ID and/or the integral cell ID.

In at least one alternative embodiment, the communication interface is further configured to: determine a physical resource used for transmitting the subsequent signal according to the beam ID and/or the at least part of the cell ID; and transmit the subsequent signal on the physical resource.

In at least one alternative embodiment, the communication interface is further configured to: generate a scrambling sequence according to the beam ID and/or the at least part of the cell ID; scramble the subsequent signal according to the scrambling sequence; and transmit the scrambled subsequent signal.

In at least one alternative embodiment, the subsequent signal includes a broadcast signal, a random access signal, a control signal, a reference signal and a data signal.

In at least one alternative embodiment, the subsequent signal includes a preamble signal; and the communication interface is further configured to: generate a preamble sequence according to the beam ID and/or the at least part of the cell ID; and transmit the preamble signal according to the preamble sequence.

In at least one alternative embodiment, the subsequent signal includes a pilot signal; and the communication interface is further configured to: generate a pilot sequence according to the beam ID and/or the at least part of the cell ID; and transmit the pilot signal according to the pilot sequence.

In at least one alternative embodiment, the cell ID comprises an integral cell ID.

Figure 6:
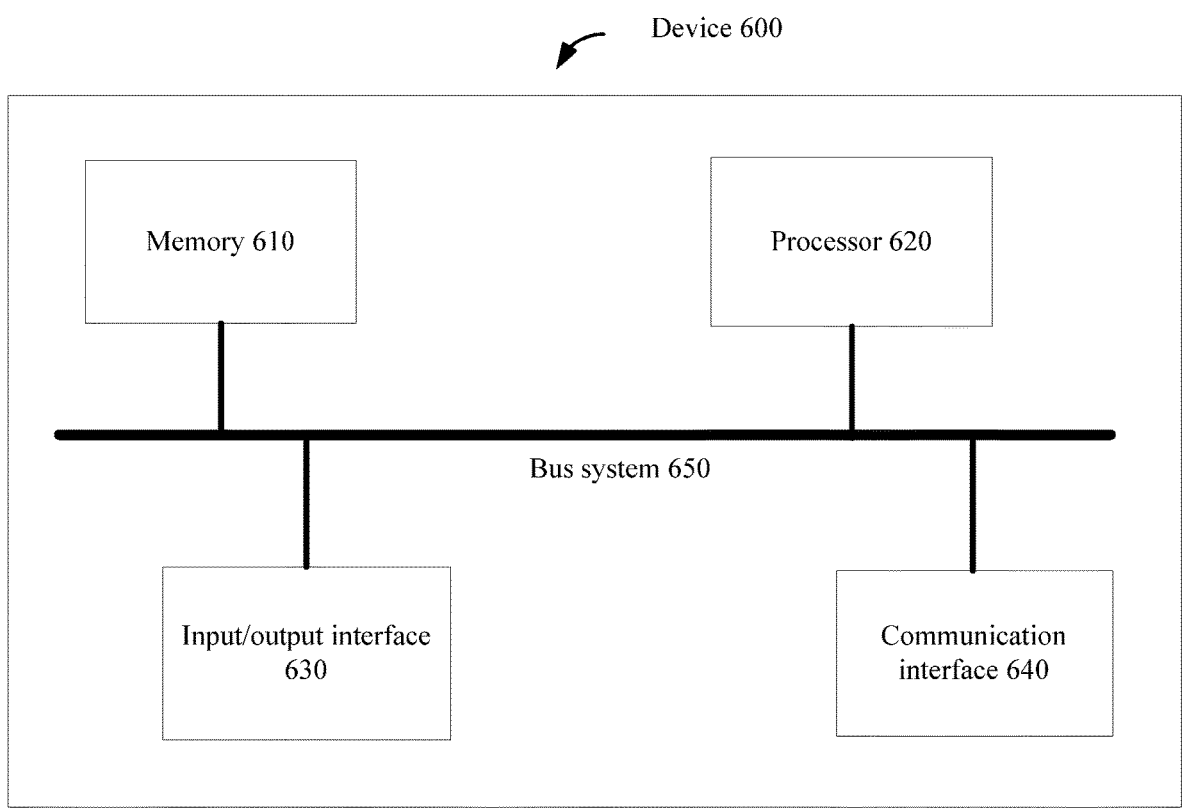
FIG. 6 illustrates a schematic block diagram of a signal transmission device according to another embodiment of the present disclosure.

FIG. 6 illustrates a schematic block diagram of a signal transmission device according to another embodiment of the present disclosure. The device 600 for signal detection shown in FIG. 6 includes: a memory 610, a processor 620, an input/output interface 630, a communication interface 640 and a bus system 650. Herein, the memory 610, the processor 620, the input/output interface 630 and the communication interface 640 are connected via the bus system 650. The memory 610 is configured to store an instruction. The processor 620 is configured to execute the instruction stored by the memory 620 so as to control the input/output interface 630 to receive input data and information, output data such as an operation result and control the communication interface 640 to send a signal.

The processor 620 is configured to determine a cell ID and a beam ID.

The communication interface 640 is configured to send a synchronization signal according to at least part of the cell ID and the beam ID.

It should be understood that, in this embodiment of the present disclosure, the processor 620 may be a universal Central Processing Unit (CPU), a microprocessor, an Application Specific Integrated Circuit (ASIC), or one or more integrated circuits, and is configured to execute a related procedure to implement the technical solutions provided by this embodiment of the present disclosure.

It should be further understood that, the communication interface 640 employs, for example but is not limited to, a transmitter-receiver device such as a transmitter-receiver to implement the communication between the device 600 for the signal detection and other devices or communication networks.

The memory 610 may include a Read-Only Memory (ROM) and a Random-Access Memory (RAM) and provides instructions and data for the processor 620. A part of the processor 620 may further include a nonvolatile random access memory. For example, the processor 620 may further store information on a type of a storage device.

Beside a data bus, the bus system 650 may further include a power bus, a control bus and a state signal bus, etc. For clarity of description, various buses in the figure all are marked as the bus system 650.

In an implementation process, the blocks in the foregoing methods may be completed using an integrated logic circuit of hardware or an instruction in a form of software in the processor 620. Blocks of the signal transmission methods disclosed with reference to the embodiments of the present disclosure may be directly executed and accomplished by means of a hardware processor, or may be executed and accomplished using a combination of hardware and software modules in the processor. The software module may be located in a mature storage medium in the art, such as a RAM, a flash memory, a ROM, a programmable ROM (PROM), an electrically erasable PROM (EEPROM) or a register. The storage medium is located in the memory 610. The processor 620 reads information from the memory 610 and completes the blocks of the foregoing methods in combination with the hardware. To avoid repetition, details are not described herein again.

In at least one alternative embodiment, the synchronization signal is one synchronization signal among multiple synchronization signals; and the communication interface is configured to: send the multiple synchronization signals via multiple beams according to the beam ID and the at least part of the cell ID, the synchronization signals sent via different beams being different.

In at least one alternative embodiment, the communication interface is configured to: determine sequence information of the synchronization signal according to the beam ID and the at least part of the cell ID; and send the synchronization signal generated based on the sequence information.

In at least one alternative embodiment, the sequence information of the synchronization signal includes a sequence ID of the synchronization signal; and the processor is configured to: determine the sequence ID of the synchronization signal according to the at least part of the cell ID, the beam ID, a preset total number of beams in each cell and a number of the at least parts of the cell ID.

In at least one alternative embodiment, the synchronization signal includes a first synchronization signal and a second synchronization signal; and the communication interface is configured to: determine sequence information of the first synchronization signal according to the at least part of the cell ID and generate the first synchronization signal based on the sequence information of the first synchronization signal; determine sequence information of the second synchronization signal according to the beam ID and generate the second synchronization signal based on the sequence information of the second synchronization signal; and send the first synchronization signal and the second synchronization signal.

In at least one alternative embodiment, the sequence information of the synchronization signal includes a sequence ID of the synchronization signal; the synchronization signal includes a first synchronization signal and a second synchronization signal; and the communication interface is configured to: determine a sequence ID of the first synchronization signal and a sequence ID of the second synchronization signal according to the at least part of the cell ID; generate the first synchronization signal according to the sequence ID of the first synchronization signal and generate the second synchronization signal according to the sequence ID of the second synchronization signal; determine a number of transmission time units spaced between a first transmission time unit and a second transmission time unit according to the beam ID; send the first synchronization signal on the first transmission time unit; and send, after a period corresponding to the number of the transmission time units, the second synchronization signal on the second transmission time unit.

In at least one alternative embodiment, the communication interface is configured to: send the synchronization signal according to the first cell ID and the beam ID, the first cell ID being one part of cell ID in an integral cell ID; and the communication interface is further configured to send the second cell ID via a synchronization channel corresponding to the synchronization signal, the second cell ID and the first cell ID being formed into the integral cell ID.

In at least one alternative embodiment, the communication interface is further configured to transmit the subsequent signal according to the beam ID and the at least part of the cell ID.

In at least one alternative embodiment, the communication interface is configured to: generate a scrambling sequence according to the beam ID and the at least part of the cell ID; scramble the subsequent signal according to the scrambling sequence; and transmit the scrambled subsequent signal.

In at least one alternative embodiment, the subsequent signal includes a broadcast signal, a control signal, a reference signal and a data signal.

In at least one alternative embodiment, the communication interface is further configured to: determine a physical resource used for transmitting the subsequent signal according to the beam ID and the at least part of the cell ID; and transmit the subsequent signal on the physical resource.

In at least one alternative embodiment, the subsequent signal includes a pilot signal; and the communication interface is further configured to: generate a pilot sequence according to the beam ID and the at least part of the cell ID; and transmit the pilot signal according to the pilot sequence.

In at least one alternative embodiment, the cell ID comprises the integral cell ID.

A person of ordinary skill in the art may be aware that, in combination with the examples described in the embodiments disclosed in this specification, units and algorithm blocks may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium and includes several instructions for instructing a computer device (which may be a personal computer, a server, or a network device) to perform all or some of the blocks of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely implementation manners of the present disclosure but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A signal transmission method, comprising:
receiving, by a terminal, a synchronization signal sent by a network side device;
determining, by the terminal, a beam Identifier (ID) and at least part of cell ID according to the synchronization signal; and
transmitting, by the terminal, a subsequent signal according to the beam ID and/or the at least part of the cell ID;
wherein determining, by the terminal, the beam ID and the at least part of cell ID according to the synchronization signal comprises:
determining, by the terminal, the beam ID and a first cell ID according to the synchronization signal, the first cell ID being one part of cell ID in an integral cell ID; and
transmitting, by the terminal, the subsequent signal according to the beam ID and/or the at least part of the cell ID comprises:
determining, by the terminal, a second cell ID from a synchronization channel corresponding to the synchronization signal, the second cell ID and the first cell ID being formed into the integral cell ID;

determining, by the terminal, the integral cell ID according to the first cell ID and the second cell ID; and transmitting, by the terminal, the subsequent signal according to the beam ID and/or the integral cell ID.

2. The method as claimed in claim 1, wherein determining, by the terminal, the beam ID and the at least part of cell ID according to the synchronization signal comprises:

determining, by the terminal, the beam ID and the at least part of the cell ID according to sequence information of the synchronization signal.

3. The method as claimed in claim 2, wherein the sequence information of the synchronization signal comprises a sequence ID of the synchronization signal; and determining, by the terminal, the beam ID and the at least part of the cell ID according to the sequence information of the synchronization signal comprises:

determining, by the terminal, the beam ID and the at least part of the cell ID according to the sequence ID of the synchronization signal, a preset total number of beams in each cell and a preset number of the at least part of the cell ID.

4. The method as claimed in claim 2, wherein the synchronization signal comprises a first synchronization signal and a second synchronization signal; and determining, by the terminal, the beam ID and the at least part of the cell ID according to the sequence information of the synchronization signal comprises:

determining, by the terminal, the at least part of the cell ID according to sequence information of the first synchronization signal; and determining, by the terminal, the beam ID according to sequence information of the second synchronization signal.

5. The method as claimed in claim 1, wherein the synchronization signal comprises a first synchronization signal and a second synchronization signal; and determining, by the terminal, the beam ID and the at least part of cell ID according to the synchronization signal comprises:

determining, by the terminal, the at least part of the cell ID according to sequence information of the synchronization signal; and determining, by the terminal, the beam ID according to a number of transmission time units spaced between a first transmission time unit and a second transmission time unit as well as a corresponding relationship between a number of transmission time units and a beam ID, wherein the first transmission time unit is a transmission time unit for transmitting the first synchronization signal, and the second transmission time unit is a transmission time unit for transmitting the second synchronization signal.

6. The method as claimed in claim 1, wherein determining, by the terminal, the beam ID and the at least part of cell ID according to the synchronization signal comprises:

determining, by the terminal, the at least part of the cell ID according to sequence information of the synchronization signal; and determining, by the terminal, the beam ID according to a physical resource used for transmitting the synchronization signal as well as a corresponding relationship between a physical resource and a beam ID.

7. The method as claimed in claim 1, wherein transmitting, by the terminal, the subsequent signal according to the beam ID and/or the at least part of the cell ID comprises:

determining, by the terminal, a physical resource used for transmitting the subsequent signal according to the beam ID and/or the at least part of the cell ID; and transmitting, by the terminal, the subsequent signal on the physical resource.

8. The method as claimed in claim 1, wherein transmitting, by the terminal, the subsequent signal according to the beam ID and/or the at least part of the cell ID comprises:

generating, by the terminal, a scrambling sequence according to the beam ID and/or the at least part of the cell ID;

scrambling, by the terminal, the subsequent signal according to the scrambling sequence; and transmitting, by the terminal, the scrambled subsequent signal.

9. The method as claimed in claim 1, wherein the subsequent signal comprises a broadcast signal, a random access signal, a control signal, a reference signal and a data signal.

10. The method as claimed in claim 1, wherein the subsequent signal comprises a preamble signal; and transmitting, by the terminal, the subsequent signal according to the beam ID and/or the at least part of the cell ID comprises:

generating, by the terminal, a preamble sequence according to the beam ID and/or the at least part of the cell ID; and transmitting, by the terminal, the preamble signal according to the preamble sequence.

11. The method as claimed in claim 1, wherein the subsequent signal comprises a pilot signal; and transmitting, by the terminal, the subsequent signal according to the beam ID and/or the at least part of the cell ID comprises:

generating, by the terminal, a pilot sequence according to the beam ID and/or the at least part of the cell ID; and transmitting, by the terminal, the pilot signal according to the pilot sequence.

12. The method as claimed in claim 1, wherein the cell ID comprises an integral cell ID.

13. A signal transmission method, comprising:

determining, by a network side device, a cell Identifier (ID) and a beam ID; and sending, by the network side device, a synchronization signal according to the beam ID and at least part of the cell ID;

sending, by the network side device, the synchronization signal according to the beam ID and the at least part of the cell ID comprises: sending, by the network side device, the synchronization signal according to a first cell ID and the beam ID, the first cell ID being one part of cell ID in an integral cell ID; and the method further comprises: sending, by the network side device, a second cell ID via a synchronization channel corresponding to the synchronization signal, the second cell ID and the first cell ID being formed into the integral cell ID.

14. The method as claimed in claim 13, wherein the synchronization signal is one synchronization signal among multiple synchronization signals; and sending, by the network side device, the synchronization signal according to the beam ID and the at least part of the cell ID comprises: sending, by the network side device, the multiple synchronization signals via multiple beams according to the beam ID and the at least part of the cell ID, the synchronization signals sent via different beams being different;

or, sending, by the network side device, the synchronization signal according to the beam ID and the at least part of the cell ID comprises: determining, by the network side device, sequence information of the synchronization signal according to the beam ID and the at least part of the cell ID; and sending, by the network side device, the synchronization signal generated based on the sequence information;

or, the synchronization signal comprises a first synchronization signal and a second synchronization signal; and sending, by the network side device, the synchronization signal according to the beam ID and the at least part of the cell ID comprises: determining, by the network side device, sequence information of the first synchronization signal according to the at least part of the cell ID, and generating, by the network side device, the first synchronization signal based on the sequence information of the first synchronization signal; determining, by the network side device, sequence information of the second synchronization signal according to the beam ID, and generating, by the network side device, the second synchronization signal based on the sequence information of the second synchronization signal; and sending, by the network side device, the first synchronization signal and the second synchronization signal;

or, sequence information of the synchronization signal comprises a sequence ID of the synchronization signal; the synchronization signal comprises a first synchronization signal and a second synchronization signal; and sending, by the network side device, the synchronization signal according to the beam ID and the at least part of the cell ID comprises: determining, by the network side device, a sequence ID of the first synchronization signal and a sequence ID of the second synchronization signal according to the at least part of the cell ID; generating, by the network side device, the first synchronization signal according to the sequence ID of the first synchronization signal and generating, by the network side device, the second synchronization signal according to the sequence ID of the second synchronization signal; determining, by the network side device, a number of transmission time units spaced between a first transmission time unit and a second transmission time unit according to the beam ID; sending, by the network side device, the first synchronization signal on the first transmission time unit; and sending, by the network side device, after a period corresponding to the number of the transmission time units, the second synchronization signal on the second transmission time unit.

15. The method as claimed in claim 14, wherein sequence information of the synchronization signal comprises a sequence ID of the synchronization signal; and determining, by the network side device, sequence information of the synchronization signal according to the beam ID and the at least part of the cell ID comprises: determining, by the network side device, the sequence ID of the synchronization signal according to the at least part of the cell ID, the beam ID, a preset total number of beams in each cell and a number of the at least part of the cell ID.

16. The method as claimed in claim 13, further comprising:

transmitting, by the network side device, a subsequent signal according to the beam ID and the at least part of the cell ID.

17. The method as claimed in claim 16, wherein transmitting, by the network side device, the subsequent signal according to the beam ID and the at least part of the cell ID comprises: generating, by the network side device, a scrambling sequence according to the beam ID and the at least part of the cell ID; scrambling, by the network side device, the subsequent signal according to the scrambling sequence; and transmitting, by the network side device, the scrambled subsequent signal;

or, transmitting, by the network side device, the subsequent signal according to the beam ID and the at least part of the cell ID comprises: determining, by the network side device, a physical resource used for transmitting the subsequent signal according to the beam ID and the at least part of the cell ID; and transmitting, by the network side device, the subsequent signal on the physical resource;

or, the subsequent signal comprises a pilot signal; and transmitting, by the network side device, the subsequent signal according to the beam ID and the at least part of the cell ID comprises: generating, by the network side device, a pilot sequence according to the beam ID and the at least part of the cell ID; and transmitting, by the network side device, the pilot signal according to the pilot sequence.

18. A terminal, comprising:

at least one processor; and a computer readable storage, coupled to the at least one processor and storing at least one computer executable instructions thereon, which when the at least one computer executable instructions is executed by the at least one processor, cause the at least one processor to carry out following actions:

receiving, by a terminal, a synchronization signal sent by a network side device;

determining, by the terminal, a beam Identifier (ID) and at least part of cell ID according to the synchronization signal; and transmitting, by the terminal, a subsequent signal according to the beam ID and/or the at least part of the cell ID;

sending, by the network side device, the synchronization signal according to the beam ID and the at least part of the cell ID comprises: sending, by the network side device, the synchronization signal according to a first cell ID and the beam ID, the first cell ID being one part of cell ID in an integral cell ID; and the method further comprises: sending, by the network side device, a second cell ID via a synchronization channel corresponding to the synchronization signal, the second cell ID and the first cell ID being formed into the integral cell ID.

19. The terminal as claimed in claim 18, wherein determining, by the terminal, the beam ID and the at least part of cell ID according to the synchronization signal comprises:

determining, by the terminal, the beam ID and the at least part of the cell ID according to sequence information of the synchronization signal.

* * * * *